(12) United States Patent
Lee et al.

(10) Patent No.: US 12,485,740 B2
(45) Date of Patent: Dec. 2, 2025

(54) CHASSIS FRAME OF A VEHICLE

(71) Applicants: HYUNDAI MOTOR COMPANY, Seoul (KR); KIA CORPORATION, Seoul (KR)

(72) Inventors: Won Hae Lee, Seoul (KR); Nam Ho Kim, Gwangmyeong-si (KR); Dae Ki Jeong, Hwaseong-si (KR); Mi Ran Park, Hwaseong-si (KR); Min Seok Kim, Seoul (KR); Ha Yeon Kwon, Seoul (KR); Byung Joo Chung, Gunpo-si (KR); Byong Cheol Kim, Seoul (KR); Seung Hak Lee, Asan-si (KR); Su Jin Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 329 days.

(21) Appl. No.: 18/135,322

(22) Filed: Apr. 17, 2023

(65) Prior Publication Data

US 2024/0198776 A1 Jun. 20, 2024

(30) Foreign Application Priority Data

Dec. 15, 2022 (KR) .................. 10-2022-0176028

(51) Int. Cl.
*B60K 1/04* (2019.01)
*B62D 21/02* (2006.01)
*B62D 21/15* (2006.01)

(52) U.S. Cl.
CPC ............... *B60K 1/04* (2013.01); *B62D 21/02* (2013.01); *B62D 21/157* (2013.01)

(58) Field of Classification Search
CPC .............. B60K 1/04; B60K 2001/0438; B62D 21/157; B62D 21/15; B60L 50/66; B60L 50/64; B60Y 2306/01
See application file for complete search history.

(56) References Cited

U.S. PATENT DOCUMENTS

| 10,017,036 B2 | 7/2018 | Lim et al. |
| 11,541,935 B2* | 1/2023 | Gonzalez Mendivil . B60K 1/04 |
| 2014/0117716 A1* | 5/2014 | Patberg .................. B62D 21/15 296/187.08 |
| 2017/0043654 A1 | 2/2017 | Lim et al. |
| 2021/0094400 A1 | 4/2021 | Loacker |

FOREIGN PATENT DOCUMENTS

| CN | 205075894 U | 3/2016 |
| JP | H0662096 B2 | 8/1994 |
| JP | 2001158383 A | 6/2001 |
| JP | 3144320 B2 | 8/2008 |
| KR | 101506422 B1 | 3/2015 |
| WO | 2019162583 A1 | 8/2019 |

* cited by examiner

*Primary Examiner* — Jason D Shanske
*Assistant Examiner* — James J Triggs
(74) *Attorney, Agent, or Firm* — Lempia Summerfield Katz LLC (57) ABSTRACT

A chassis frame of a vehicle includes a deck mounting bracket to mount a deck to an upper side of the deck mounting bracket and coupled to an upper side of a frame side member, a battery cross member installed to be spaced apart from the frame side member by the deck mounting bracket, and side protectors respectively provided at opposite ends of the battery cross member.

9 Claims, 11 Drawing Sheets

CHASSIS FRAME OF A VEHICLE

CROSS-REFERENCE TO RELATED APPLICATION

This application claims the benefit of and priority to Korean Patent Application No. 10-2022-0176028, filed on Dec. 15, 2022, in the Korean Intellectual Property Office, the entire contents of which are incorporated herein by reference.

BACKGROUND

1. Field

The present disclosure relates to a chassis frame structure of an electric vehicle mounted with a battery.

2. Description of the Related Art

A purpose-built vehicle (PBV) is a vehicle configured through assembly of a drive module associated with driving and a life module configured to form a passenger compartment and a mounting space having various forms according to market demand, in order to cope with a tendency of markets toward small quantity batch production.

Accordingly, such a PBV has an advantage in that it is possible to rapidly produce a vehicle satisfying market demand through only change of a life module.

In addition, in accordance with recent tendency of vehicle technologies toward pursuance of eco-friendly environments, the drive module has been developed to mount a high-voltage battery (hereinafter simply referred to as a "battery") therein.

The drive module is configured by mounting elements associated with driving of the vehicle to a chassis frame. The battery is mainly mounted to a lower side of the vehicle using the chassis frame.

The battery mounted in the vehicle, as mentioned above, should be protected as much as possible. Conventional structures for protection of the battery are mainly implemented using a vehicle body mounted to an upper side of the chassis frame.

However, in the case of a vehicle including a front part provided with a separate cabin in which a driver sits to drive the vehicle, and a rear part in which a deck having various forms satisfying consumer demand is mountable, it is difficult to configure structures for protecting a battery mounted in the vehicle because the form of the deck may be varied in accordance with consumer demand.

The above matters disclosed in this section are provided merely to enhance understanding of the general background of the present disclosure and should not be taken as an acknowledgement or any form of suggestion that the matters form the related art already known to a person skilled in the art.

SUMMARY

The present disclosure has been made in view of the above problems, and it is an object of the present disclosure to provide a chassis frame of a vehicle capable of effectively protecting a battery mounted in the vehicle from lateral collision of the vehicle irrespective of variation in a deck in the case in which the vehicle is configured to allow mounting of a deck having various forms therein.

In an aspect of the present disclosure, a chassis frame of a vehicle includes: a deck mounting bracket configured to mount a deck to an upper side thereof and coupled to an upper side of a frame side member, at least one battery cross member installed to be spaced apart from the frame side member by the deck mounting bracket, and side protectors respectively provided at opposite ends of the at least one battery cross member.

The at least one battery cross member may further protrude toward a lateral side of the vehicle than the frame side member such that the side protectors are disposed to be laterally spaced from the frame side member.

The at least one battery cross member may be formed with a deformation inducing corrugation for absorption of impact energy between a portion thereof coupled to the deck mounting bracket and a portion thereof coupled to each of the side protectors.

The at least one battery cross member may be installed to extend through the deck mounting bracket in a state of being upwardly spaced apart from the frame side member.

The side protector may include a plurality of coupled wave plates each formed with a plurality of waves.

The side protector may include an inner wave plate and an outer wave plate coupled to each other to form a space at a lateral side of the vehicle. The at least one battery cross member may be configured to extend through the inner wave plate in an inserted state and coupled to the side protector.

A reinforcement bracket for prevention of rotational deformation of the side protector with respect to the at least one battery cross member may be provided between the at least one battery cross member and the inner wave plate.

The inner wave plate may be formed with a wave curved in an upward or downward direction of the vehicle. The reinforcement bracket may include a wave coupler having a shape corresponding to a shape of the wave of the inner wave plate.

The at least one battery cross member may include a battery mount for mounting of a battery.

The at least one battery cross member may include at least two battery cross members that are disposed in parallel while being spaced apart from each other in a forward or rearward direction of the vehicle. One of the two battery cross members is disposed in a relatively front side of the vehicle and may include a cabin mounting bracket for mounting of a cabin.

In another aspect of the present disclosure, a chassis frame of a vehicle includes frame side members respectively disposed at opposite lateral sides of the vehicle while extending lengthily in a forward or rearward direction of the vehicle, at least one battery cross member installed at an upper side of the frame side members to extend lengthily in a lateral direction of the vehicle while being spaced apart from the frame side members. In particular, the at least one battery cross member is configured to mount a battery at a lower side of the at least one battery cross member. The chassis frame may further include side protectors installed at opposite ends of the at least one battery cross member in a state of being spaced apart from the frame side members toward the lateral sides of the vehicle, respectively, to withstand lateral impact force from the vehicle.

The at least one battery cross member may be installed to extend through a deck mounting bracket coupled to the upper side of each of the frame side members such that the battery cross member is upwardly spaced apart from the frame side member.

The at least one battery cross member may be formed with a deformation inducing corrugation capable of absorbing impact energy applied to the battery cross member via each of the side protectors.

Each of the side protectors may include a plurality of wave plates that may be overlapped each other, and each of the wave plates may include a plurality of waves curved in an upward or downward direction of the vehicle.

The side protector may include an inner wave plate disposed toward an inside of the vehicle, and an outer wave plate disposed toward an outside of the vehicle. The inner wave plate and the outer wave plate may be coupled to each other to form a space therebetween.

The at least one battery cross member may be coupled to the side protector while extending, at an end thereof, through the inner wave plate in an inserted state.

A reinforcement bracket may be installed at a lower side of the at least one battery cross member, and may inhibit or suppress the side protector from being rotationally deformed with respect to the at least one battery cross member.

The reinforcement bracket may include a wave coupler formed to have a shape corresponding to a shape of waves of the inner wave plate and coupled to an inside of the inner wave plate, and an inclined support having an inclined surface enabling the wave coupler to be supported by the at least one battery cross member.

The at least one battery cross member may include a plurality of battery cross members, and battery cross members are disposed to be spaced apart from one another in the forward or rearward direction of the vehicle. A plurality of battery mounts for mounting of a battery may be provided at a lower side of the battery cross members.

A cabin mounting bracket for mounting of a cabin to be mounted at a front side of the vehicle may be mounted to the battery cross member.

BRIEF DESCRIPTION OF THE DRAWINGS

The above and other objects, features and other advantages of the present disclosure should be more clearly understood from the following detailed description taken in conjunction with the accompanying drawings, in which.

DETAILED DESCRIPTION

Hereinafter, embodiments of the present disclosure are described in detail with reference to the accompanying drawings, and the same or similar elements are designated by the same reference numerals regardless of the numerals in the drawings and redundant descriptions thereof have been omitted.

The suffixes "module" and "unit" of elements herein are used for convenience of description and thus can be used interchangeably and do not have any distinguishable meanings or functions.

In describing the present disclosure, moreover, the detailed descriptions have been omitted when a specific description of publicly known technologies to which the present disclosure pertains is judged to obscure the gist of the present disclosure. In addition, it should be noted that the accompanying drawings are merely illustrated to easily explain the spirit of the present disclosure, and therefore, should not be construed as limiting the spirit of the present disclosure to the accompanying drawings. On the contrary, the present disclosure is to cover all modifications, equivalents, and alternatives falling within the spirit and scope of the present disclosure as defined by the claims.

In the meantime, although terms including an ordinal number, such as first or second, may be used to describe a variety of constituent elements, the constituent elements are not limited to the terms, and the terms are used only for the purpose of discriminating one constituent element from other constituent elements.

It should be understood that, when one element is referred to as being "connected to" or "coupled to" another element, one element may be "connected to" or "coupled to" another element via a further element although one element may be directly connected to or directly coupled to another element. On the other hand, it should be understood that, when an element is referred to as being "directly connected to" or "directly coupled to" another element, there is no intervening element present.

As used in the description of the present disclosure and the appended claims, the singular forms are intended to include the plural forms as well, unless context clearly indicates otherwise. When a component, device, element, or the like of the present disclosure is described as having a purpose or performing an operation, function, or the like, the component, device, or element should be considered herein as being "configured to" meet that purpose or to perform that operation or function.

It should be further understood that the terms "comprises" and/or "comprising," or "includes" and/or "including" when used in this specification, specify the presence of stated features, regions, integers, steps, operations, elements, and/or combinations thereof, but do not preclude the presence or addition of one or more other features, regions, integers, steps, operations, elements, components, and/or combinations thereof.

Figure 1:
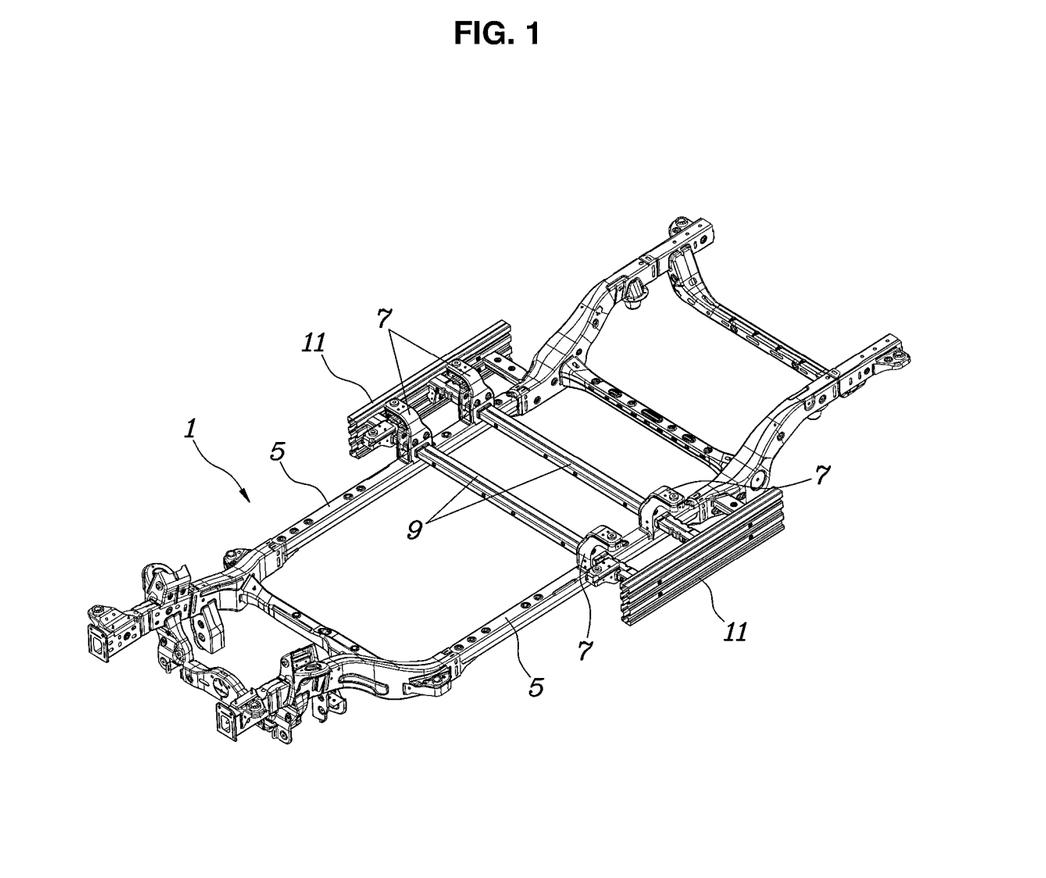
FIG. 1 is a view showing a chassis frame of a vehicle according to an embodiment of the present disclosure.
Figure 2:
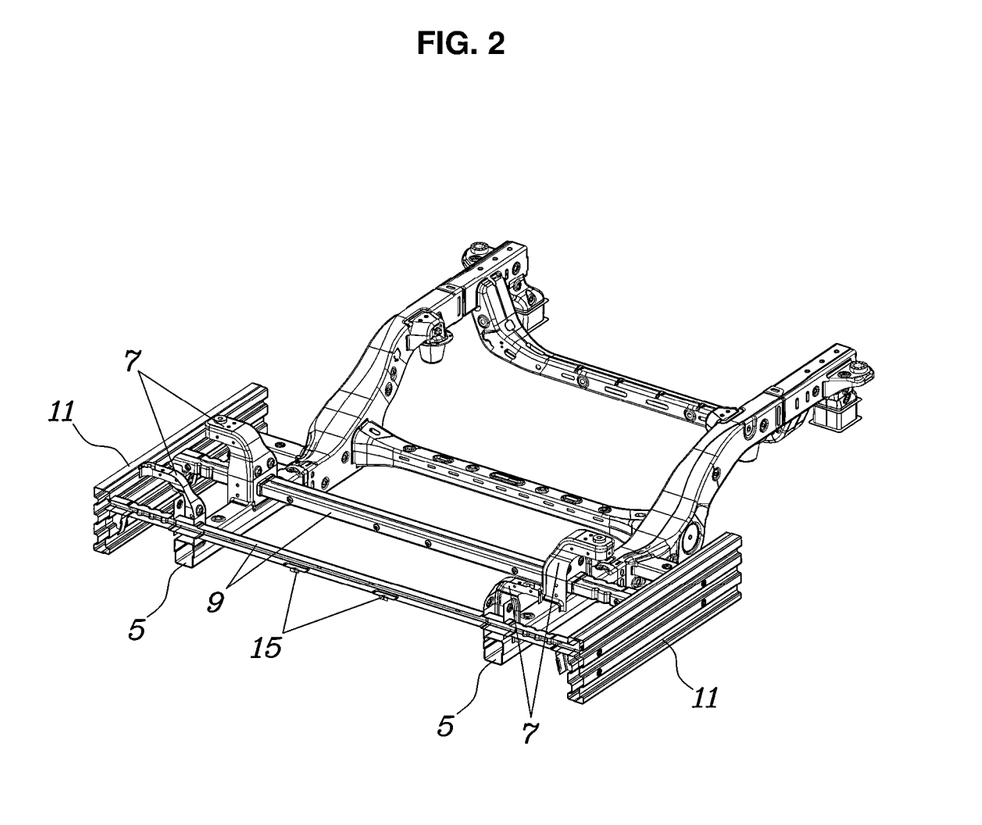
FIG. 2 is a view showing a state in which a vehicle front part of FIG. 1 is cut out.
Figure 3:
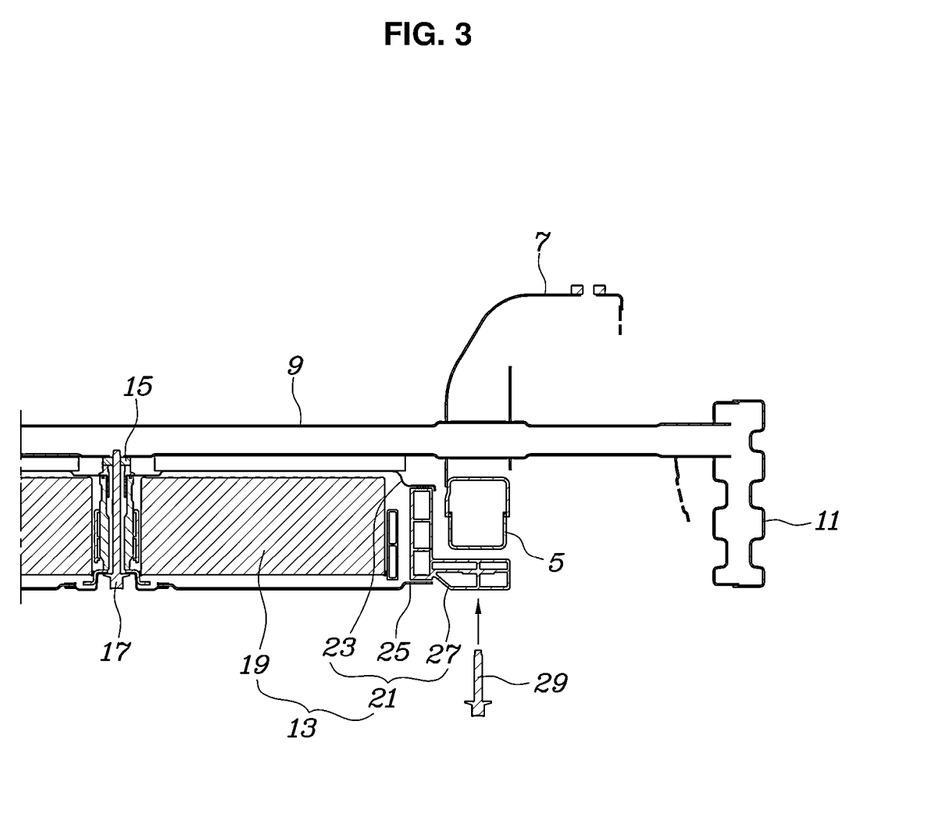
FIG. 3 is a view illustrating a coupled state of a battery while showing a cut surface of FIG. 2 in plan view.
Figure 4:
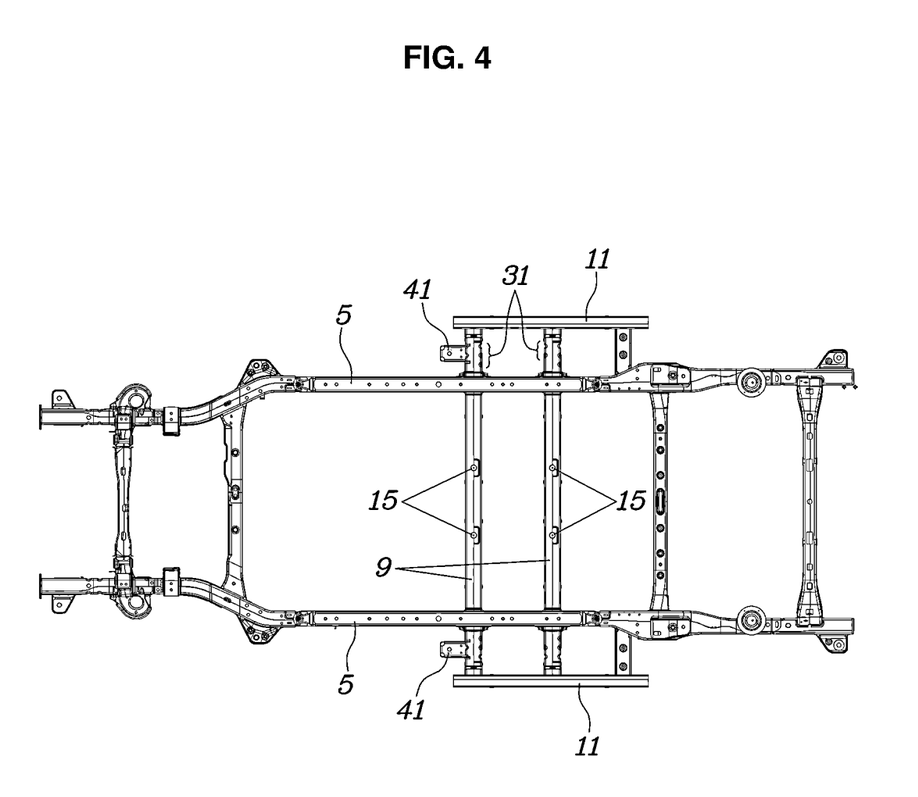
FIG. 4 is a view showing the chassis frame when viewed from a bottom side.
Figure 5:
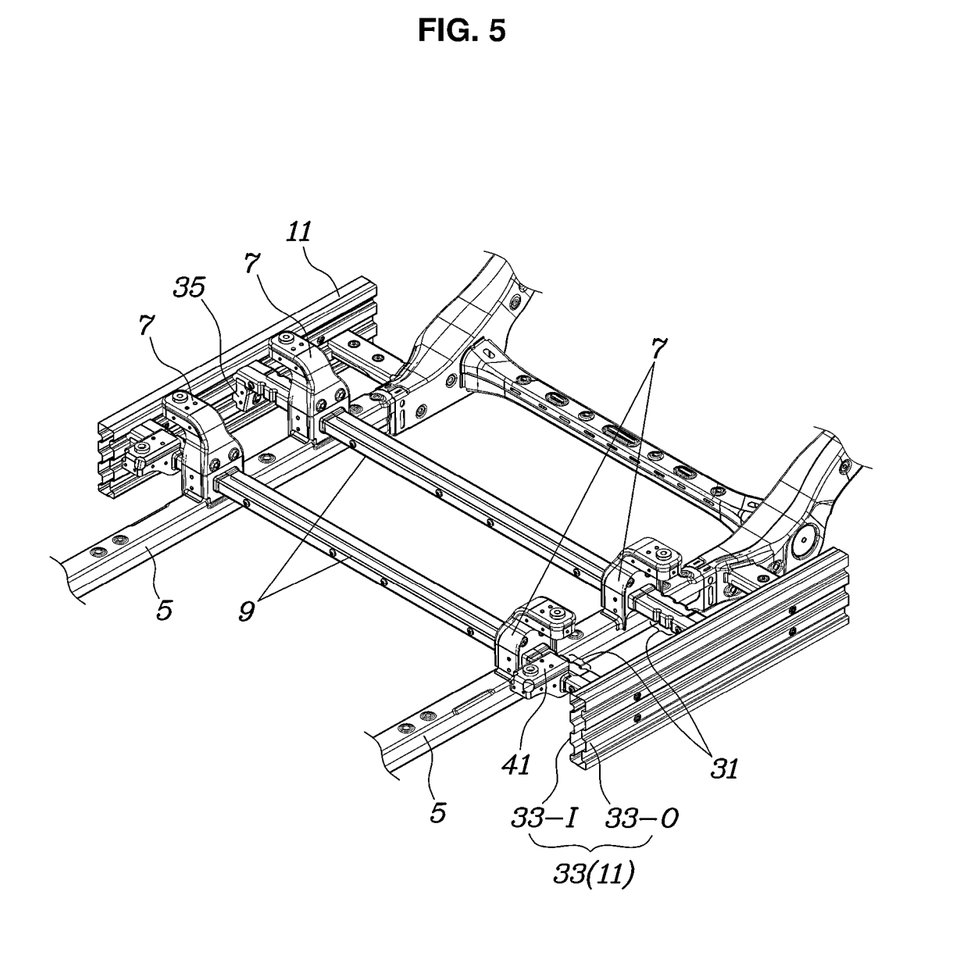
FIG. 5 is a detailed view showing a main part of FIG. 1.
Figure 6:
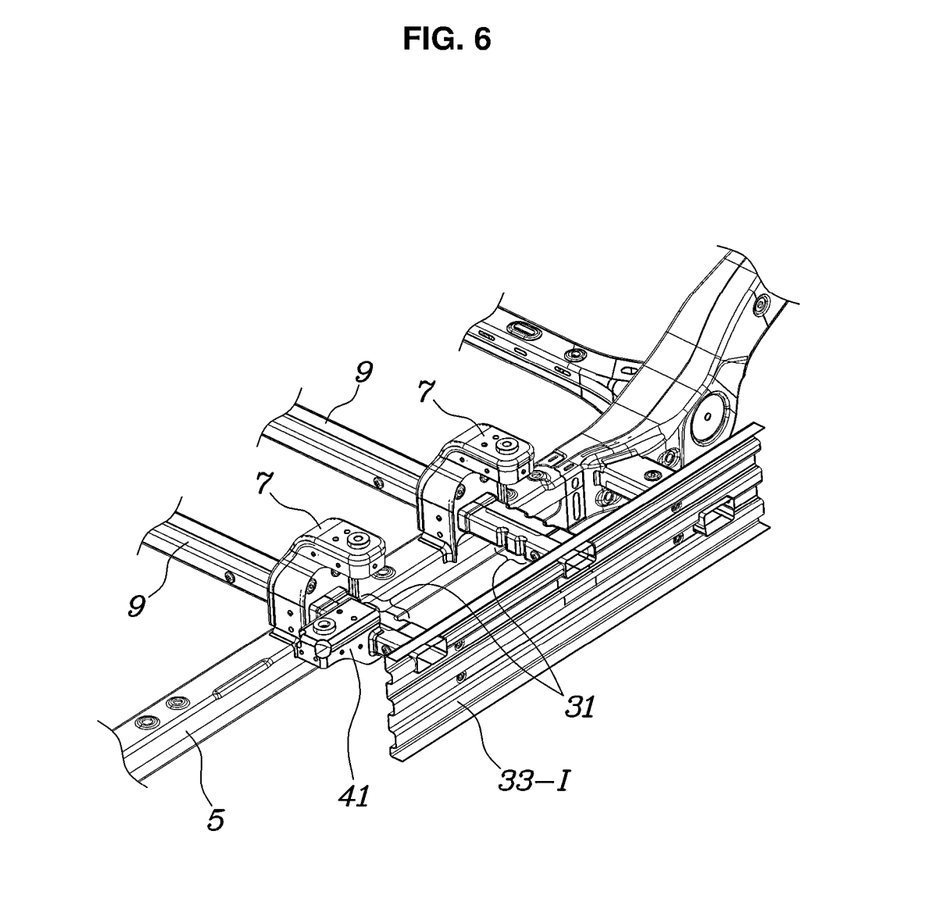
FIG. 6 is a detailed view showing a state in which an outer wave plate is removed from the main part of FIG. 5.
Figure 7:
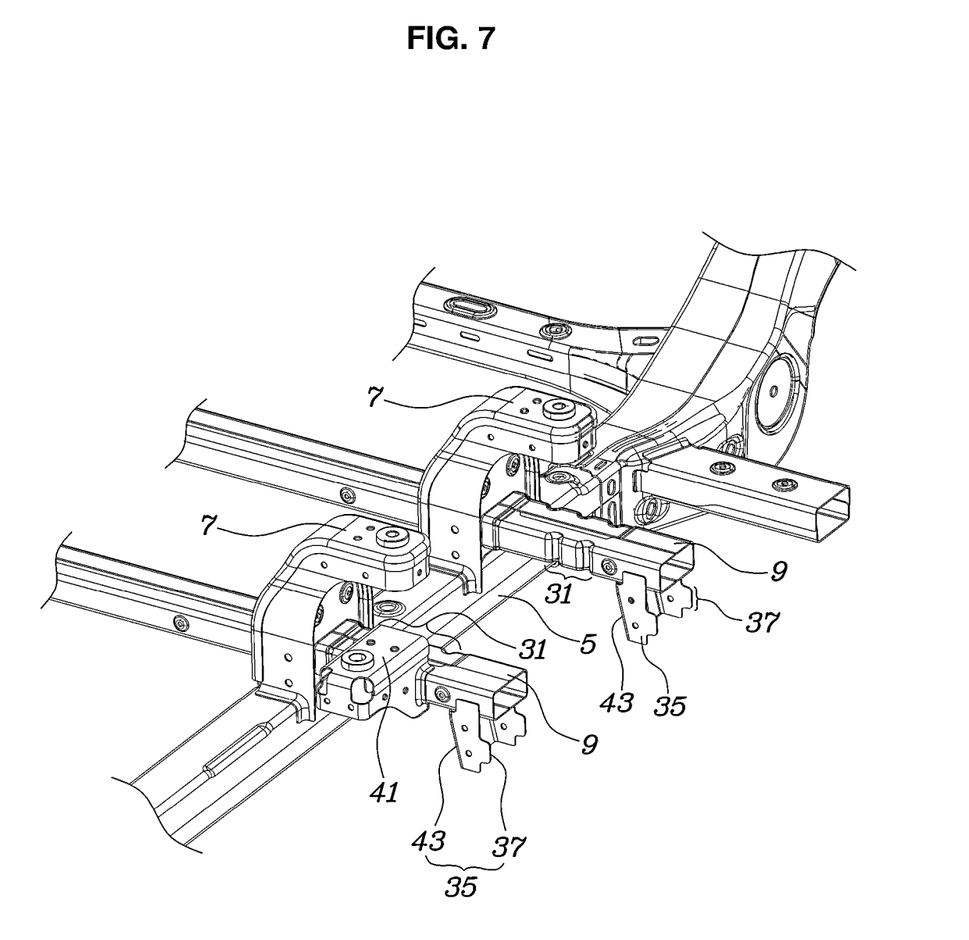
FIG. 7 is a view showing a state in which an inner wave plate is removed from FIG. 6.
Figure 8:
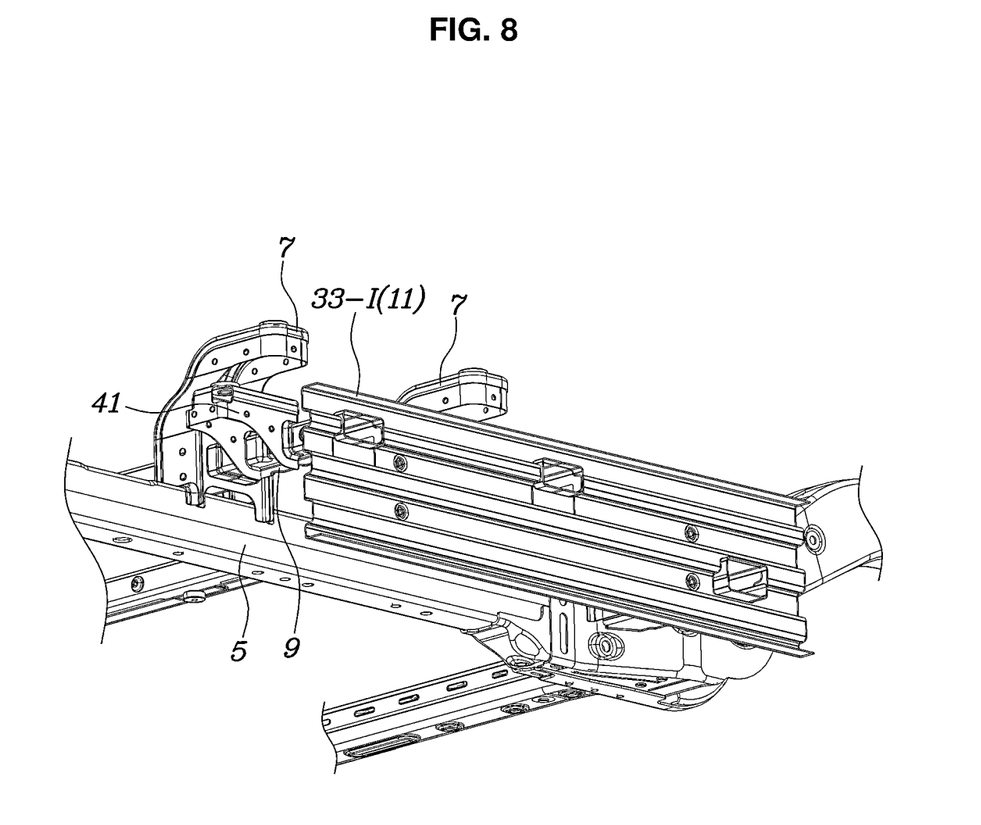
FIG. 8 is a view showing a configuration of FIG. 6 when viewed from a bottom side.
Figure 9:
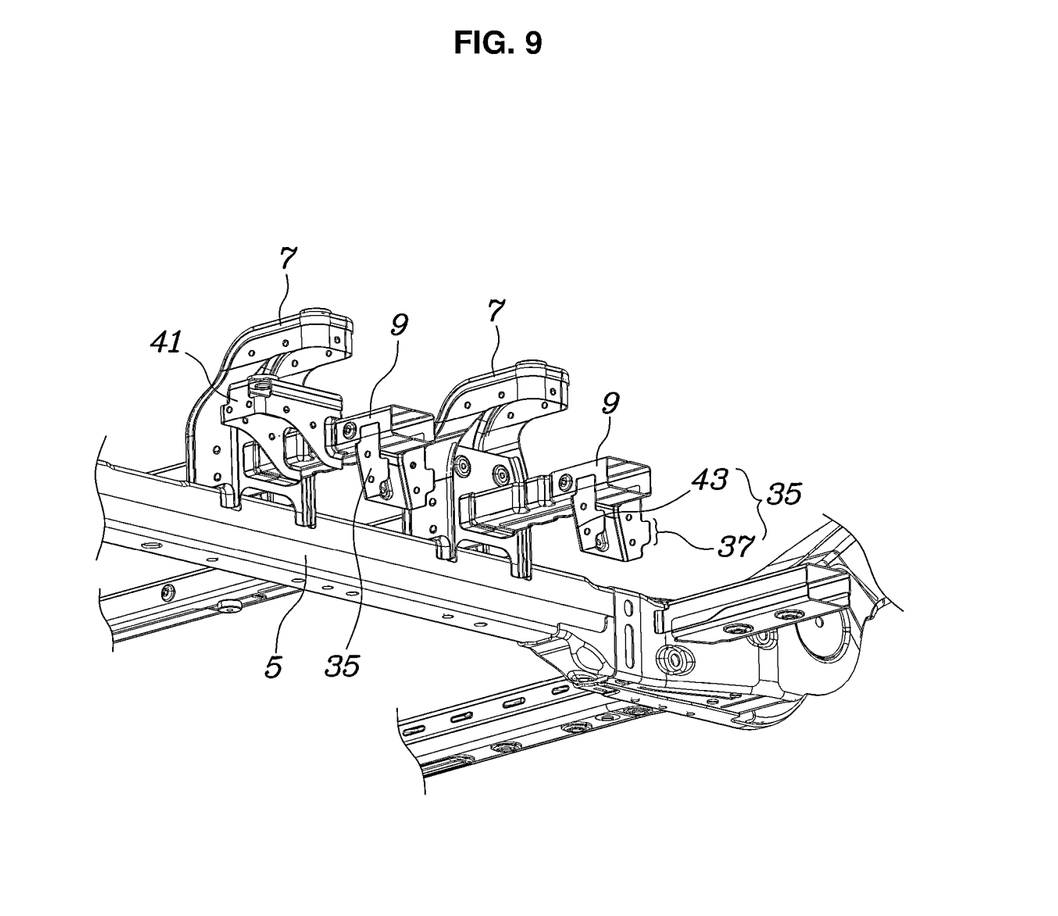
FIG. 9 is a view showing a state in which the inner wave plate is removed from FIG. 8.
Figure 10:
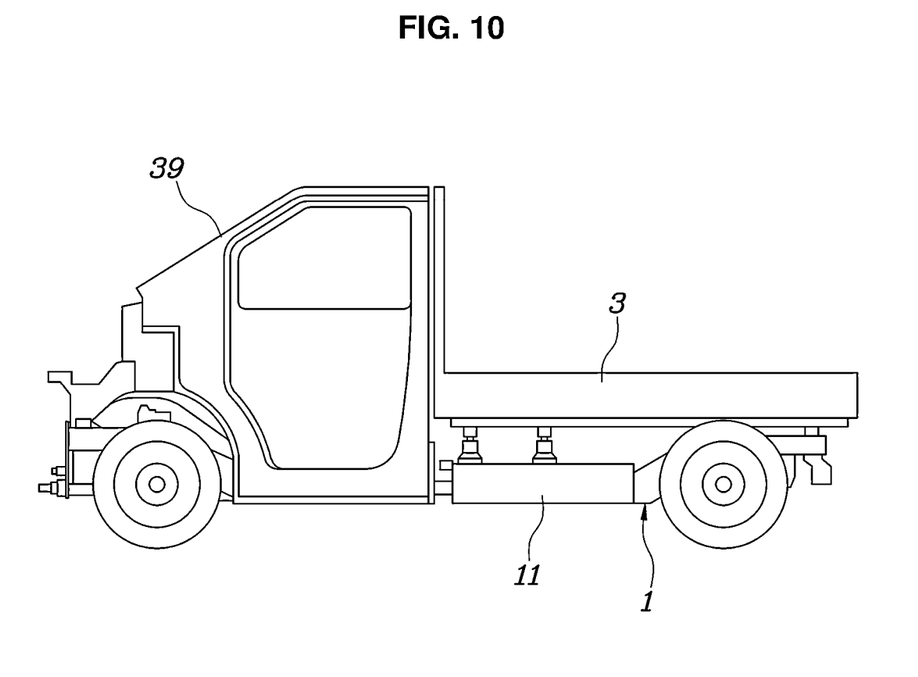
FIG. 10 is a view illustrating a state in which an open type deck is installed at an upper side of the chassis frame of the vehicle according to the embodiment of the present disclosure.
Figure 11:
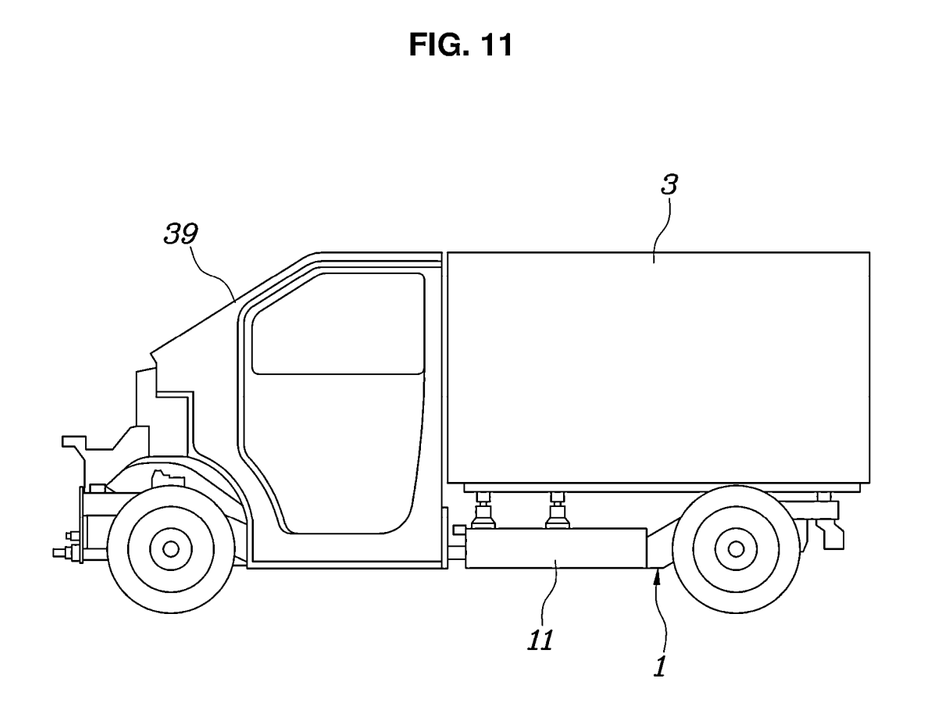
FIG. 11 is a view illustrating a state in which a closed type deck is installed at the upper side of the chassis frame of the vehicle according to the embodiment of the present disclosure.

Referring to FIGS. 1-11, a chassis frame 1 of a vehicle according to an embodiment of the present disclosure includes: a deck mounting bracket 7 configured to mount a deck 3 (in FIG. 10) to an upper side thereof and coupled to an upper side of a frame side member 5, a battery cross member 9 installed to be spaced apart from the frame side member 5 by the deck mounting bracket 7, and side protectors 11 respectively provided at opposite ends of the battery cross member 9.

In an embodiment, the battery cross member 9 further protrudes toward a lateral side of the vehicle than the frame side member 5 and, as such, the side protectors 11 are disposed to be laterally spaced from the frame side member 5.

The chassis frame 1 according to the embodiment of the present disclosure is configured to enable the side protectors 11 and the battery cross member 9 to withstand an impact force applied from the lateral side of the vehicle and to absorb the resultant impact energy in order to inhibit or prevent deformation of the frame side member 5 as much as possible because the side protectors 11 are disposed to be laterally spaced apart from the frame side member 5 by the battery cross member 9.

Accordingly, a battery 13 disposed inside the frame side member 5 may be effectively protected from impact applied from the lateral side of the vehicle.

A battery mount 15 for mounting of the battery 13 may be provided at the battery cross member 9. A battery fastening bolt 17, which extends through the battery 13, may be coupled to the battery mount 15.

For reference, the battery 13 is constituted by an inner battery cell 19, and a battery case 21 supporting the battery cell 19 while enclosing the battery cell 19. In one embodiment, the battery case 21 includes: an upper cover 23 and a lower case 25 respectively enclosing upper and lower portions of the battery cell 19, and a battery side frame 27 installed at a side of the battery case 21 while interconnecting the upper cover 23 and the lower case 25.

The battery side frame 27 is fixed to a lower side of the frame side member 5 by a plurality of mounting bolts 29, thereby forming a structure for firmly fixing the battery 13 to the chassis frame 1, together with the battery fastening bolt 17 extending through the battery 13.

The battery cross member 9 is formed with a deformation inducing corrugation 31 for absorption of impact energy between a portion thereof coupled to the deck mounting bracket 7 and a portion thereof coupled to each side protector 11.

Accordingly, when external impact force is applied to the side protector 11, the deformation inducing corrugation 31 of the battery cross member 9 is deformed and, as such, the side protector 11 effectively absorbs impact energy. As a result, it may be possible to better protect the battery 13.

The battery cross member 9 is installed to extend through the deck mounting bracket 7 in a state of being upwardly spaced apart from the frame side member 5.

Accordingly, the battery cross member 9 is maintained in a state of being firmly held by the deck mounting bracket 7 in a normal state, but prevents, in a lateral collision accident, transmission of impact force, which is transmitted through the side protector 11, to the frame side member 5 as much as possible. As a result, deformation of the frame side member 5 may be inhibited or prevented as much as possible.

The side protector 11 is configured through coupling of a plurality of wave plates 33 each formed with a plurality of waves.

Accordingly, the side protector 11 may have a relatively high section modulus, as compared to the weight thereof, and, as such, bending thereof caused by impact force applied from a lateral side of the vehicle may be effectively suppressed.

The side protector 11 is constituted by an inner wave plate 33-I and an outer wave plate 33-O coupled to each other to form a space at a lateral side of the vehicle. The battery cross member 9 is coupled to the side protector 11 while extending through the inner wave plate 33-I in an inserted state.

Accordingly, a considerable portion of external impact force applied to the side protector 11 may be absorbed through deformation of the side protector 11 itself.

In addition, a reinforcement bracket 35 for prevention of rotational deformation of the side protector 11 with respect to the battery cross member 9 is provided between the battery cross member 9 and the inner wave plate 33-I.

The inner wave plate 33-I is formed with a wave curved in an upward or downward direction of the vehicle. The reinforcement bracket 35 includes a wave coupler 37 having a shape corresponding to a shape of the wave of the inner wave plate 33-I.

Accordingly, the side protector 11 may effectively withstand impact force applied thereto from a lateral side of the vehicle in a firm state without being rotationally deformed with reference to the battery cross member 9.

In one embodiment, at least two battery cross members 9 are provided and the at least two battery cross members 9 are disposed in parallel while being spaced apart from each other in a forward or rearward direction of the vehicle. In this form, one of the battery cross members 9 disposed in a relatively front side of the vehicle is provided with a cabin mounting bracket 41 to mount a cabin 39.

The chassis frame 1 of the vehicle according to the embodiment of the present disclosure as described above may be further described as follows.

As one embodiment of the present disclosure, the chassis frame 1 includes: longitudinally extending (i.e., extending in a forward or rearward direction of the vehicle) frame side members 5 that are respectively disposed at opposite lateral sides of the vehicle, and laterally extending (i.e., extending in a lateral direction of the vehicle) battery cross members 9 that are installed at an upper side of the frame side members 5 of the vehicle while being spaced apart from each other. In particular, the battery cross members 9 are configured to mount a battery at a lower side thereof. The chassis frame 1 further includes side protectors 11 installed at opposite ends of the battery cross member 9 in a state of being spaced apart from the frame side members 5 toward the lateral sides of the vehicle, respectively, to withstand lateral impact force from the vehicle.

The battery cross member 9 is installed to extend through a deck mounting bracket 7 coupled to the upper side of each frame side member 5 such that the battery cross member 9 is upwardly spaced apart from the frame side member 5.

The battery cross member 9 is formed with a deformation inducing corrugation 31 capable of absorbing impact energy applied to the battery cross member 9 via each side protector 11.

Each side protector 11 is constituted by a plurality of wave plates 33. In one embodiment, the wave plates 33 may be overlapped each other. Each of the wave plates 33 includes a plurality of waves curved in an upward or downward direction of the vehicle.

The side protector 11 is constituted by an inner wave plate 33-I disposed toward an inside of the vehicle, and an outer wave plate 33-O disposed toward an outside of the vehicle. The inner wave plate 33-I and the outer wave plate 33-O are coupled to each other to form a space therebetween.

The battery cross member 9 is coupled to the side protector 11 while extending, at an end thereof, through the inner wave plate 33-I in an inserted state.

A reinforcement bracket 35 is installed at a lower side of the battery cross member 9 in order to suppress the side protector 11 from being rotationally deformed with respect to the battery cross member 9.

The reinforcement bracket 35 includes a wave coupler 37 formed to have a shape corresponding to a shape of waves of the inner wave plate 33-I and coupled to an inside of the inner wave plate 33-I, and an inclined support 43 having an inclined surface enabling the wave coupler 37 to be supported by the battery cross member 9.

The battery cross member 9 is provided in plural such that the plural battery cross members 9 are disposed to be spaced apart from one another in the forward or rearward direction of the vehicle. A plurality of battery mounts 15 for mounting of a battery is provided at a lower side of the battery cross members 9.

A cabin mounting bracket 41 for mounting of a cabin 39 to be mounted at a front side of the vehicle is mounted to each battery cross member 9.

As apparent from the above description, in accordance with the embodiments of the present disclosure, in a vehicle configured to allow mounting of a deck having various forms therein, it may be possible to effectively protect a battery mounted in the vehicle from lateral collision of the vehicle irrespective of variation in the deck.

Although the embodiments of the present disclosure have been disclosed for illustrative purposes, those having ordinary skill in the art should appreciate that various modifications, additions and substitutions are possible, without departing from the scope and spirit of the present disclosure.

What is claimed is:

1. A chassis frame of a vehicle, comprising:
   a deck mounting bracket configured to mount a deck to an upper side thereof and coupled to an upper side of a frame side member;
   at least one battery cross member protruding outward beyond an outer side of the frame side member and extending through the deck mounting bracket in a state of being upwardly spaced apart from the frame side member; and
   side protectors respectively provided at opposite ends of the at least one battery cross member.

2. The chassis frame according to claim 1, wherein the at least one battery cross member further protrudes toward a lateral side of the vehicle than the frame side member such that the side protectors are disposed to be laterally spaced from the frame side member.

3. The chassis frame according to claim 2, wherein the at least one battery cross member is formed with a deformation inducing corrugation configured to absorb impact energy between a portion thereof coupled to the deck mounting bracket and a portion thereof coupled to each of the side protectors.

4. The chassis frame according to claim 2, wherein each of the side protectors comprises a plurality of coupled wave plates each formed with a plurality of waves.

5. The chassis frame according to claim 2, wherein:
   each of the side protectors comprises an inner wave plate and an outer wave plate coupled to each other to form a space at the lateral side of the vehicle; and
   the at least one battery cross member is configured to extend through the inner wave plate in an inserted state and coupled to the side protectors.

6. The chassis frame according to claim 5, wherein a reinforcement bracket is configured to inhibit rotational deformation of the side protectors with respect to the at least one battery cross member and provided between the at least one battery cross member and the inner wave plate.

7. The chassis frame according to claim 6, wherein:
   the inner wave plate is formed with a wave curved in an upward or downward direction of the vehicle; and
   the reinforcement bracket comprises a wave coupler having a shape corresponding to a shape of the wave of the inner wave plate.

8. The chassis frame according to claim 1, wherein the at least one battery cross member comprises a battery mount for mounting of a battery.

9. The chassis frame according to claim 1, wherein:
   the at least one battery cross member includes two battery cross members that are disposed in parallel while being spaced apart from each other in a forward or rearward direction of the vehicle; and
   one of the two battery cross members is disposed in a relatively front side of the vehicle and comprises a cabin mounting bracket for mounting of a cabin.

* * * * *